Patented Oct. 31, 1944

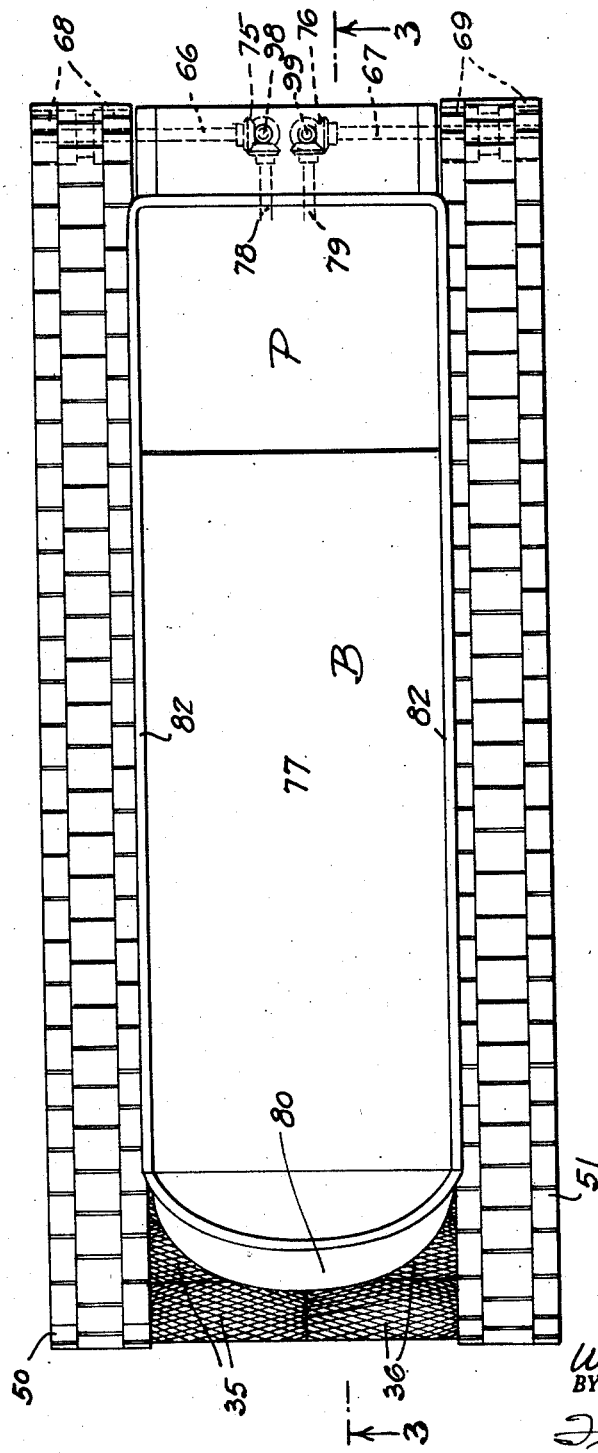

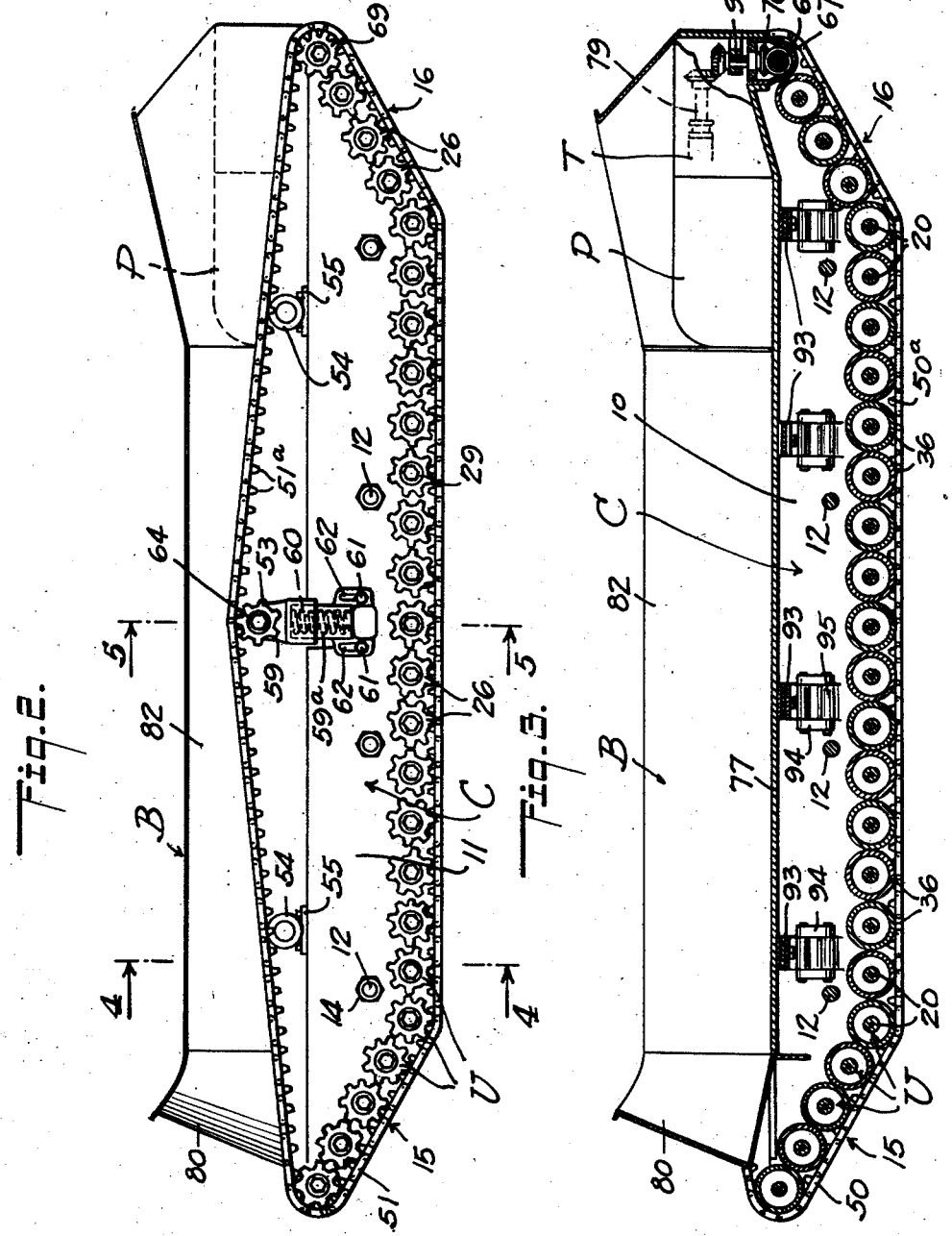

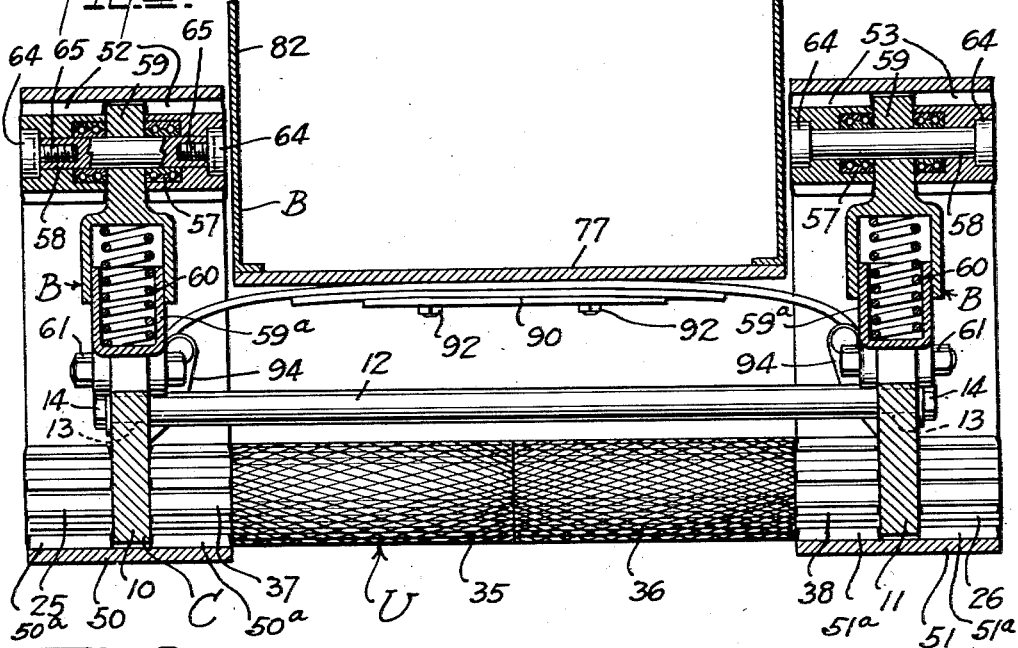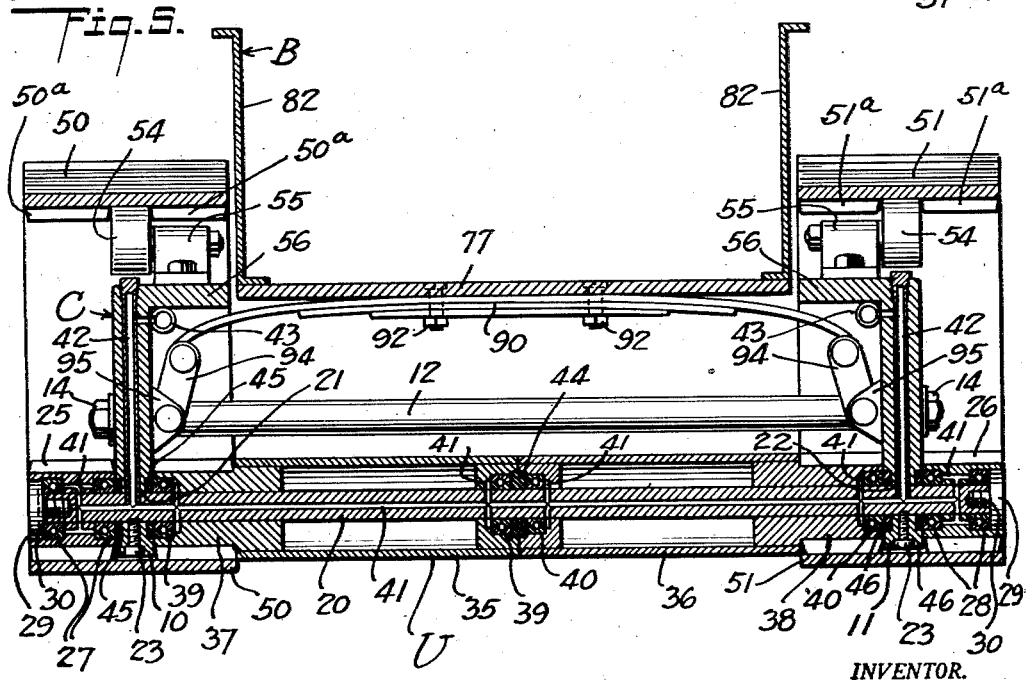

2,361,800

UNITED STATES PATENT OFFICE 2,361,800

TRACTOR VEHICLE

William C. Thompson, San Fernando, Calif.

Application January 3, 1944, Serial No. 516,791

12 Claims. (Cl. 305—9)

My invention relates generally to vehicles, and more particularly to vehicles of the tractor or track-laying type adapted to traverse uneven terrain.

An object of my invention is to provide a tractor vehicle which is structurally characterized by means operable in conjunction with endless ground-engaging tracks or belts to augment the tractive effort thereof in such manner as to greatly increase the efficiency of the vehicle so as to enable it to negotiate rougher terrain and surmount more difficult obstacles, whereby to materially increase the range of usefulness of the vehicle.

Another object of my invention is to provide a tractor vehicle embodying spaced endless tracks, with a row of closely related traction rollers spanning the space between the tracks and operatively connected to the respective tracks for co-action therewith in driving the vehicle over terrain impossible to negotiate by the tracks alone, all while retaining the advantageous features of this type of vehicle, including speed, maneuverability and extremely short turning radius.

With these and other objects in view, my invention consists in the combinations, arrangements and functional relationships of elements as set forth in the following specification and particularly pointed out in the appended claims.

In the accompanying drawings,

Figure 1 is a plan view of one form of tractor vehicle embodying my invention;

Figure 2 is a view of the tractor vehicle in side elevation;

Figure 3 is a vertical longitudinal sectional view of the vehicle taken on the line 3—3 of Figure 1;

Figures 4 and 5 are enlarged vertical transverse sectional views taken respectively on the lines 4—4 and 5—5 of Figure 2.

Referring specifically to the drawings, my invention in its illustrated embodiment comprises a chassis or frame designated generally by C and composed of right and left longitudinal side members 10 and 11 rigidly tied together in spaced parallel relation by tie bars 12 whose reduced end portions 13 pass through openings in the side members and are threaded to receive nuts 14.

At the forward and rear ends of the vehicle, the under sides of the members 10 and 11 are inclined upwardly towards the respective extremities of the members as indicated at 15 and 16. At intervals along the lengths of the bottoms and inclined portions of the members 10 and 11 are sprocket wheel and traction roller units designated generally at U and all of identical construction so that a detailed description of one unit will suffice for all.

Each of the several units U is composed of a dead axle 20 whose length extends transversely of the chassis C. The end portions of the axle 20 pass through alined openings 21 and 22 in the frame members 10 and 11, and the axle is locked to the members by set screws 23 threaded through the latter and seating in sockets in the axle, all as shown in Figure 5. Journaled on the end portions of the axle exteriorly of the frame members 10 and 11 are right and left sprocket wheels 25 and 26 which are mounted on anti-friction bearings 27 and 28 and are confined against axial displacement by the frame members and by the socket heads 29 of retaining screws 30 screwed tightly into threaded bores in the ends of the axle. Journaled on the axle 20 between the frame members 10 and 11 are right and left traction elements in the form of rollers 35 and 36 which are of hollow construction with their confronting ends contiguous and their remote ends formed to provide right and left sprocket wheels 37 and 38 of the same pitch diameters and faces as the respective sprocket wheels 25 and 26. The rollers 35 and 36 are mounted on anti-friction bearings 39 and 40 and are of such diameter that the rollers of each unit U are in proximity or closely spaced relation to those of the next unit as shown in Figure 3.

Lubricant can be supplied to the bearings 27, 28, 39 and 40 of the unit U through passages 41 in the axle 20 and sprocket wheels 25, 26, 37 and 38, from passages 42 in the frame members 10 and 11, to which latter passages the lubricant is supplied from main pipes 43 extending along the inner sides of the frame members. The pipes 43 serve as manifolds to supply the bearings of the units, and are adapted to be detachably connected to a suitable source of lubricant under pressure (not shown) so that the working parts can be lubricated at will. A packing ring 44 surrounds the axle 20 at the joint between the right and left rollers 35 and 36, and other packing rings 45 and 46 are accommodated in suitable pockets in the frame members 10 and 11 so as to surround the axle, all to prevent loss of lubricant from the bearings 27, 28, 39 and 40.

Flexible and endless traction elements in the form of link belts 50 and 51 having suitably ribbed or otherwise roughened tread surfaces and inner and outer spaced apart rows of driving teeth 50a and 51a respectively, are trained about the right sprocket wheels 25, 37, and left sprocket wheels 26, 38, respectively, as shown in Figures 2, 4 and 5, so that the lower or ground-engaging stretches of the belts 50 and 51 are tensioned by spring-mounted sprocket wheels 52 and 53, and are further supported and guided by idler rollers 54 journaled in brackets 55 secured on laterally inward projecting horizontal portions 56 of the frame members 10 and 11.

The sprocket wheels 52 and 53 are arranged in pairs and are journaled by bearings 57 on stub axles 58 supported in one part 59 of two-part brackets having oppositely disposed and telescopically associated cup shaped portions containing coil springs 60. Bolts 61 pass through vertical slots 62 in the other part 59a of the brackets and through openings in the frame members 10 and 11, to secure the bracket parts 59a rigidly to the frame members with the springs 60 under load so as to yieldingly urge the bracket parts 59 upwardly and thus apply tension to the belts 50 and 51 through the medium of the sprocket wheels 52 and 53. When the bolts 61 are loosened, the bracket parts 59 and 59a will lower sufficiently to relieve the belts of the spring tension and render the belts accessible for removal and repair.

The bracket parts 59 extend between the wheels of the respective pairs of sprocket wheels 52 and 53 for co-action with the socket heads 64 of retaining screws 65 in confining the sprocket wheels against axial displacement from the stub axles 58 as will be clear from Figure 4.

The rollers 35 and 36 have their peripheries suitably roughened to provide traction, and have their bottommost portions located as closely as possible to the level of the traction surfaces of the bottom stretches of the belts 50 and 51. As these rollers span the space between the belts, tractive effort can be exerted across the entire width of the vehicle or any part thereof which happens to engage ground of uneven contour.

Journaled in the rear upper corners of the frame members 10 and 11 and in suitable transmission housing 65a between the frame members, are alined right and left drive shafts 66 and 67 to which are fixed at opposite sides of the respective frame members, right and left pairs of driving sprocket wheels 68 and 69 respectively, about which the belts 50 and 51 are trained so as to be driven thereby. Suitable gearing 75 and 76 operatively connect the shafts 66 and 67 to a combination power plant P and transmission and clutch mechanisms T of well known construction, supported on the rear end portion of a floor 77 constituting part of the body B of the vehicle. The power plant P is adapted to deliver power to the two clutch-controlled drive shafts 78 and 79 (Figure 1) to drive same in unison in one direction or the other for forward or backward movement of the vehicle, or to drive such shafts in opposite directions, or selectively for right and left steering movements of the vehicle, all of which mode of operation is well known to those familiar with the art.

At the forward end of the floor 77 is an armored nose section 80 adapted to carry armament to counterbalance the weight of the power plant and transmission mechanism. From the floor 77 rise side walls 82 between the belts 50 and 51 as shown in Figures 4 and 5. Semi-elliptic leaf springs 90 are transversely arranged at intervals beneath the floor 77 and have their medial portions secured to the latter by bolts 92. The eye ends of these springs are connected to shackles 94 pivotally mounted on lugs 95 projecting from the inner sides of the frame members 10 and 11, to thereby provide a spring suspension for the body B, power plant P and transmission mechanism T, which same are effectively cushioned against shocks to which the chassis of the vehicle is subjected when in operation over uneven terrain.

In order to compensate for relative vertical movements between the chassis C and body B and yet positively drive the shafts 66 and 67, same are operatively connected to the transmission T by mechanisms well known in the art, such as vertically arranged splined jack shafts 98 and 99 which are thus rendered extensible and contractible.

In operation, and with the belts 50 and 51 driven by the drive sprocket wheels 68 and 69, the sprocket wheels 25, 37 and 26, 38 will be independently driven by the respective belts so as to correspondingly rotate the respective traction rollers 35 and 36 to propel the vehicle. As the rollers 35 and 36 are being positively driven, they materially aid the belts 50 and 51 in the propulsion of the vehicle by increasing its tractive effort. The vehicle can be used for military operations in the transporting of material or personnel, and can be readily armored and provided with suitable armament for offensive operations.

Furthermore, it will be apparent that the vehicle is of very low height and has an extremely low center of gravity, all so as to render it more difficult to see as well as to hit, which advantages add greatly to its stafety and usefulness in offensive operations involving the element of surprise and concealment of movements.

I claim:

1. A tractor vehicle comprising: a chassis; flexible and endless traction elements arranged in spaced parallel relation and having driving teeth; means including sprocket wheels rotatably mounted on the chassis and operatively engaged by the teeth of said elements so as to be driven thereby and mount the chassis for movement over the ground; other rotatably mounted traction elements spanning the space between the first said traction elements and operatively connected to said sprocket wheels so as to be driven thereby at the same linear speed as the first said traction elements; and means for driving the first said traction elements.

2. A tractor vehicle comprising: a chassis; flexible and endless traction elements arranged in spaced parallel relation and having driving teeth; means including sprocket wheels rotatably mounted on the chassis at intervals along the length of said elements and in meshing engagement with the teeth of the latter so as to be driven thereby and mount the chassis for movement over the ground; other traction elements rotatably mounted on the chassis between the first said traction elements co-axially of said sprocket wheels and driven thereby at the same linear speed as the first said traction elements; and means for driving the first said traction elements.

3. A tractor vehicle comprising: a chassis; flexible and endless traction elements arranged in spaced parallel relation and having driving teeth; means including sprocket wheels rotatably mounted on the chassis at intervals along the length of said elements and in meshing engagement with the teeth of the latter so as to be driven thereby, with a lower stretch of said elements supported by the sprocket wheels for engagement with the ground; axles supported by the chassis and carrying the sprocket wheels; other traction elements rotatably mounted on said axles between the first said traction elements and having sprocket wheels in meshing engagement with the teeth of the latter to drive said other traction elements at the same linear speed as the first said traction elements; and means for driving the first said traction elements.

4. A tractor vehicle comprising: a chassis; flexible and endless traction elements arranged in spaced parallel relation; means including rotary driven elements journaled on the chassis and operatively connected to said traction elements with the latter supported in upper and lower stretches for travel of the lower stretches on the ground; means for driving said traction elements; and other rotary traction elements mounted on the chassis to span the first said traction elements co-axially of said driven elements and operatively connected to the latter to be driven at the same linear speed as the first said traction elements.

5. A tractor vehicle comprising: a chassis; flexible and endless traction elements arranged in spaced parallel relation; means including rotary driven elements journaled on the chassis and operatively connected to said traction elements with the latter supported in upper and lower stretches for travel of the lower stretches on the ground; means for driving said traction elements; and right and left traction rollers mounted on said chassis for rotation about axes co-axially related to the axes of said driven elements and operatively connected to the latter to be driven thereby at the same linear speed as that of said traction elements; said right and left traction rollers co-acting to span the space between said traction elements and constituting one traction unit contiguously related to the rollers of the next unit.

6. A tractor vehicle comprising: a chassis frame including right and left frame members rigidly connected in spaced relation; axles spanning said members transversely thereof at intervals along their lengths and supported by said members; right and left endless traction belts; means mounting said belts on said axles for travel over the ground; means for driving said belts; right and left traction elements mounted on said axles between said belts for co-action in spanning the space therebetween; and means co-acting with said belts to drive the traction elements from the belts at the same linear speed as that of the latter.

7. A tractor vehicle comprising: a chassis frame including right and left side frame members rigidly connected in spaced relation; axles spanning said members transversely thereof at intervals along their lengths and supported by said members; right and left endless traction belts; means mounting said belts on said axles for travel over the ground; means for driving said belts; right and left traction elements mounted on said axles between said belts for co-action in spanning the space therebetween; means co-acting with said belts to drive the traction elements from the belts at the same linear speed as that of the latter; a body; and means resiliently mounting the body on the chassis between said belts to yield vertically in response to ground shocks.

8. A tractor vehicle comprising: a chassis frame including right and left side frame members rigidly connected in spaced parallel relation; axles spanning said members transversely thereof at intervals along their lengths and supported by said members; right and left endless belts having driving teeth; sprocket wheels journaled on said axles at the outer sides of said frame members and meshing with said teeth of said belts; right and left traction rollers journaled on said axles and co-acting to span the space between said belts, with the rollers of successive axles being contiguously related; and sprocket wheels secured to said rollers at the inner sides of said frame members and meshing with the teeth of said belts so as to drive said rollers from the belts; and means for driving said belts.

9. A tractor vehicle comprising: a chassis frame including right and left side frame members rigidly connected in spaced relation; axles spanning said members transversely thereof at intervals along their lengths and supported by said members; right and left endless belts having driving teeth arranged in spaced apart inner and outer rows with said frame members projecting between the rows of teeth so as to co-act therewith in confining the belts against lateral displacement from said frame members; sprocket wheels journaled on said axles at the outer sides of said frame members and meshing with the outer rows of teeth; right and left traction rollers journaled on said axles and co-acting to span the space between said belts, with the rollers of successive axles being contiguously related; sprocket wheels secured to said rollers at the inner sides of said frame members and meshing with the inner rows of teeth so as to drive the rollers from the belts; and means for driving the belts.

10. A tractor vehicle comprising: a chassis frame including right and left side frame members and tie bars rigidly connecting same in spaced parallel relation; axles spanning said frame members transversely at intervals along the lengths thereof; means rigidly securing said axles to the frame members against rotation and axial displacement; right and left driving belts having driving teeth; right and left sprocket wheels journaled on said axles at the outer sides of said frame members and meshing with the outer portions of said teeth of said belts; right and left traction rollers journaled on said axles and co-acting to span the space between said belts, with the rollers of each axle being contiguously related to the rollers of the next axle; sprocket wheels on the outer ends of said rollers disposed at the inner sides of said frame members in meshing engagement with the teeth of said belts; and means for driving said belts.

11. A tractor vehicle comprising: a chassis frame including right and left side frame members and tie bars rigidly connecting same in spaced parallel relation; axles spanning the frame members transversely at intervals along the lengths of the latter; means rigidly securing said axles to the frame members against rotation and axial displacement; right and left traction belts having driving teeth; means for mounting said belts on the chassis to form upper and lower stretches, and including right and left sprocket wheels journaled on said axles and meshing with said teeth along the lower stretches of said belts; right and left traction rollers journaled on said axles and co-acting to span the space between said belts, and with the rollers on each axle being contiguous to the rollers on the next axle; means operatively connecting said rollers to the respective belts so as to be driven thereby at the same linear speed as that of the belts; means for driving the belts; a tensioning element rotatably mounted and vertically adjustable on said frame members and engaging the upper stretches of said belts; and means urging the tensioning elements upwardly to yieldingly maintain the belts under tension.

12. A tractor vehicle comprising: a chassis frame including right and left side frame members and tie bars rigidly connecting same in spaced parallel relation; axles spanning the frame members transversely at intervals along the lengths of the latter; means rigidly securing said axles to the frame members against rotation and axial displacement; right and left traction belts having driving teeth; means for mounting said belts on the chassis to form upper and lower stretches, and including right and left sprocket wheels journaled on said axles and meshing with said teeth along the lower stretches of said belts; right and left traction rollers journaled on said axles and co-acting to span the space between said belts, and with the rollers on each axle being contiguous to the rollers on the next axle; means operatively connecting said rollers to the respective belts so as to be driven thereby at the same linear speed as that of the belts; a tensioning element rotatably mounted and vertically adjustable on said frame members and engaging the upper stretches of said belts; means urging the tensioning elements upwardly to yieldingly maintain the belts under tension; a body disposed between said right and left frame members and belts, and including a floor and sides; springs connecting said body and frame members to resiliently mount the body for vertical movements relative to the chassis in response to shocks imposed on the latter; a power plant supported on said body; and means operatively connecting the power plant to said belts while rendering relative vertical movements of the chassis and body free to be effected.

WILLIAM C. THOMPSON.